United States Patent [19]

Rahm

[11] Patent Number: 5,113,794
[45] Date of Patent: May 19, 1992

[54] ANIMAL SHELTER FLOORING APPARATUS

[76] Inventor: Larry Rahm, R.R. #2, Box 92, Truman, Minn. 56088

[21] Appl. No.: 753,941

[22] Filed: Sep. 3, 1991

[51] Int. Cl.$^5$ ............................................. A01J 1/00
[52] U.S. Cl. ..................................................... 119/28
[58] Field of Search ........................ 119/17, 19, 20, 28

[56] References Cited

U.S. PATENT DOCUMENTS

| | | | |
|---|---|---|---|
| 1,259,802 | 3/1918 | St. John | 119/28 |
| 3,455,279 | 7/1969 | Krevit | 119/28 |
| 3,762,372 | 10/1973 | Mente et al. | 119/28 X |
| 4,018,188 | 4/1977 | Burdette | 119/28 |
| 4,183,324 | 1/1980 | Nobble | 119/28 X |
| 4,258,662 | 3/1981 | Schafer | 119/28 |

*Primary Examiner*—Gene Mancene
*Assistant Examiner*—Thomas Price
*Attorney, Agent, or Firm*—Donald A. Jacobson

[57] ABSTRACT

Flooring for an animal shelter uses inwardly sloping wedge shaped flooring members held in a spaced apart parallel relationship by wedge shaped center spacers and end spacers having an outward slope. These wedge shapes match such that when the inclined surfaces of the spacers and the flooring members adjoin each other the flooring members will hold the spacers in place. The flooring members ends also incline inward so that a pair of aligned flooring members with their ends abutting enclose a triangular shaped space. A rod extending through the inclined surfaces of the center spacer is arranged to extend into this space when the inclined surfaces of the center spacer and the two flooring member adjoin. This rod prevents the center spacer from moving longitudinally along the flooring members. An end spacer with similar inclined sides has a bar extending across an end perpendicular to the inclined sides. This bar will also prevent the end spacer from moving longitudinally along the flooring members when flooring members are placed on opposite sides of the end spacer with the inclined surfaces adjoining, the ends aligned, and the bar located on the outside. The flooring members are assembled on site within a supporting structure such that the flooring members are parallel, with center spacers being placed between the adjacent ends of the flooring members where the ends of two flooring members abut, and end spacers being placed between the adjacent ends of the flooring members where the flooring terminates.

3 Claims, 3 Drawing Sheets

ANIMAL SHELTER FLOORING APPARATUS

FIELD OF THE INVENTION

This invention relates to the field of construction, specifically in the construction of spaced apart slatted floors for use in animal housing.

BACKGROUND OF THE INVENTION

The use of spaced apart concrete or other slab material used in the floors for housing animals is well known. In St. John, U.S. Pat. No. 1,259,802 opposing precast openings a spaced apart relationship for a number of parallel bars which are supported above a drainage pit. In Krevit, U.S. Pat. No. 3,455,279 a pre-cast slat is provided with bearing surfaces, flanges for engaging foundation members and adjacent slats for supporting and maintaining the slats in position. In Johnson, U.S. Pat. No. 28,834 a lightweight floor uses a plurality of channel members fastened together by associated clips which engage the channel members at their ends. In Lehe, U.S. Pat. No. 3,837,319 a slatted flooring system uses a plurality of U-shaped main channels interconnected in spaced parallel relationship by U-shaped connectors which engage similarly shaped outer channels at the upper outer corners of each channel. In Bowser, U.S. Pat. No. 3,995,593 a floor structure having a plurality of downwardly open U-shaped channel members arranged in a parallel spaced apart relationship by a plurality of spacer members and retainer members secured to the spacer members.

SUMMARY OF THE INVENTION

The instant invention utilizes rectangular shaped flooring members made of concrete, which are simply placed adjacent to one another upon prepared supporting surfaces over a drainage pit. The flooring members are held spaced apart and parallel to each other by end and center spacers.

A drainage pit made of poured concrete has supporting ledges incorporated into opposite sides. Concrete columns from the bottom of the pit support a central concrete cross-member at the same height and parallel to these opposed ledges. These ledges and cross-members provide the supporting surfaces for the flooring members. The spacing of the cross-member from the ledges and the horizontal dimensions of the cross-members and ledges are such that a flooring member will span the distance from the ledges to near the center of the cross-member. When two flooring members are aligned end to end the dimensions are such that there is a small gap between the flooring members at the cross-member in the center and between the flooring member and the sides at each ledge. The pit opening is sized so that an integral number of flooring members can completely cover the pit opening.

The flooring members have inclined surfaces which incline inward on all edges from the upper side to the lower side. The flooring members are installed with the inclined surfaces projecting inward and downward. A center spacer has a length which is slightly longer than the width of the cross-member. This center spacer is installed between each aligned pair of flooring members over the cross-member. These center spacers have the same inclined side surfaces as the flooring members do, but are installed with the inclined surfaces inverted so the center spacer will nest between and under the edges of the flooring members.

These center spacers are also formed of cement with a fiberglass rod placed within the cement during manufacture, arranged such that the rod projects outward from the center of the center spacer along its length and parallel to the upper surface as installed. These rods extend between the pairs of aligned flooring members within the gaps provided by inward inclined ends of the flooring members. The center spacers provide the proper spacing between the flooring members and are prevented from moving off the cross member by the rod extending between the ends of the adjacent flooring members.

An end space with the same cross-section as the center spacer is slightly longer than the width of the ledges. A narrow metal plate is bolted to one end of this end spacer. This bar extends outward beyond both sides of the end spacer. The end spacer is placed on the ledge between the floor members with the metal bar parallel to the ledge and adjacent to the end of the flooring member. The end spacer is prevented from sliding from the ledge because of the bar bearing against the end of the flooring member.

More than one cross-member can be used with these flooring members with center spacers provided for each cross-member. Similarly a pit having a width equal to that of a flooring member can be used but here only end spacers would be required on the opposite ends.

Since the center spacers are held in position by rods, the end spacers by metal bars, and the flooring members bear against the spacers along their edges and against the adjacent flooring member or the pit edge, no mortar is required to hold the spacers or the flooring members in position. This approach permits assembling the floor member on site with no cement used in the assembly and later replacing one of the floor members or spacers if they are weathered or damaged.

DETAILED DESCRIPTION OF THE PREFERRED EMBODIMENT

Figure 1:
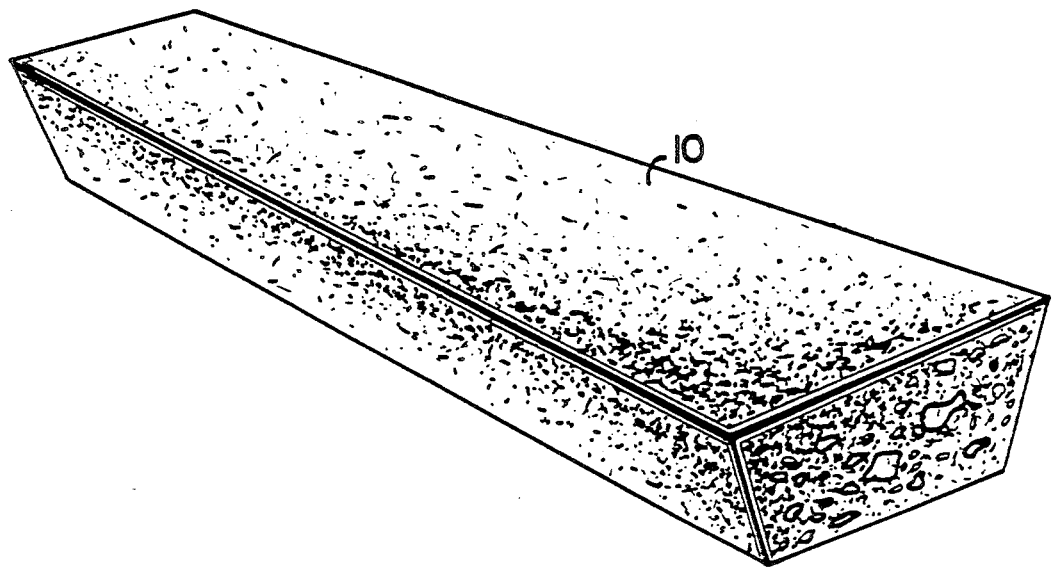
FIG. 1 is an isometric view of a cement flooring member.
Figure 2:
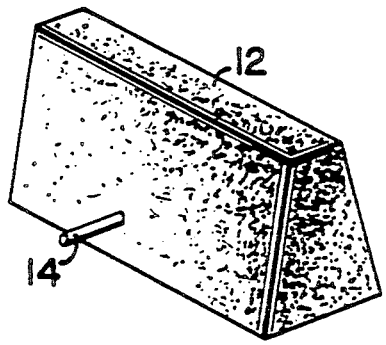
FIG. 2 is an isometric view of a center spacer.
Figure 3:
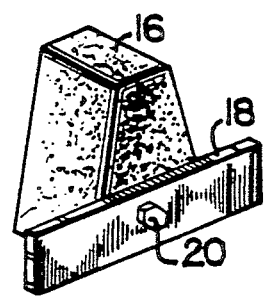
FIG. 3 is an isometric view of an end spacer.

In FIG. 1 a flooring member 10 made of concrete is shown. Flooring member 10 has inclined edges on all sides which taper inward from the top surface to the bottom surface. In FIG. 2 a center spacer 12 made of concrete formed with a fiberglass rod 14 extending through the tapered sides is shown. Center spacer 12 has the same side taper as flooring member 10 excepting that the taper extends outward from the top to the bottom. Rod 14 protrudes an equal amount from opposite sides of center spacer 12. In FIG. 3 a concrete end spacer 16 has a metal bar 18 secured to one end by a bolt 20 through a hole in the end spacer which is secured by a nut. End spacer 16 has the same side taper as center spacer 12.

Figure 4:
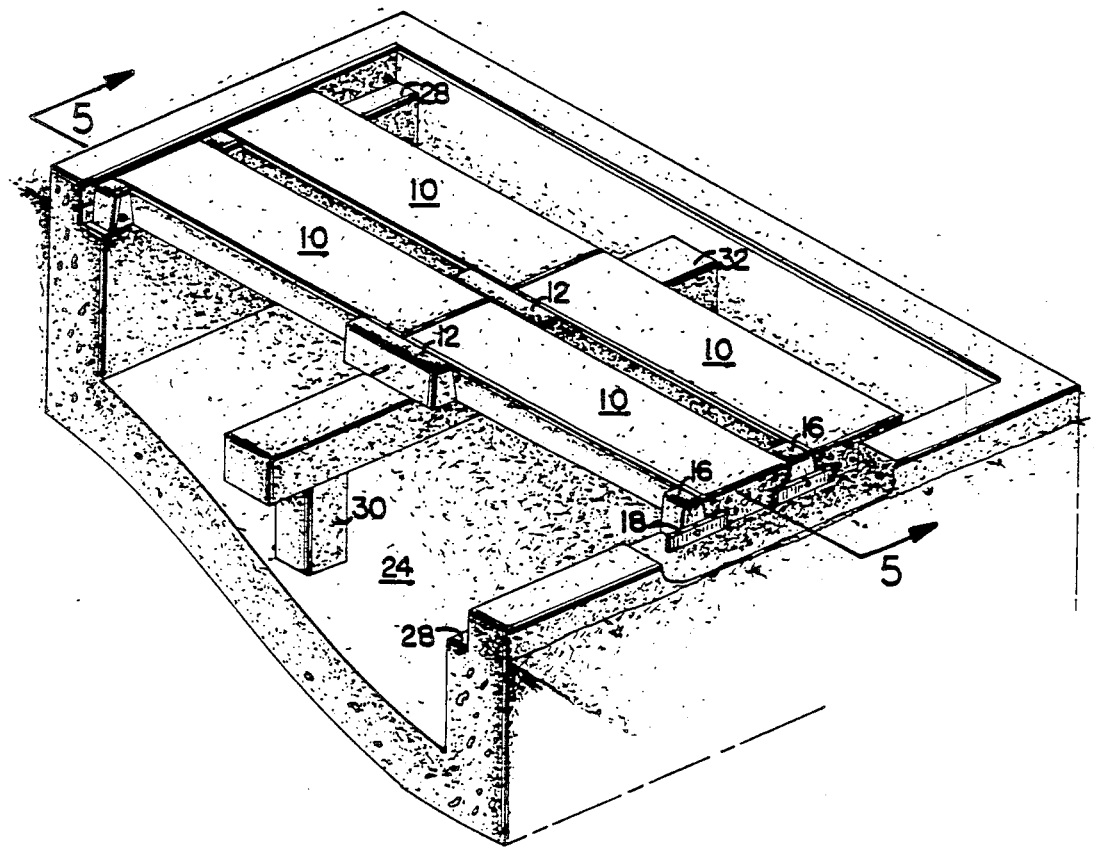
FIG. 4 is an isometric view of flooring supported and installed above a pit.
Figure 5:
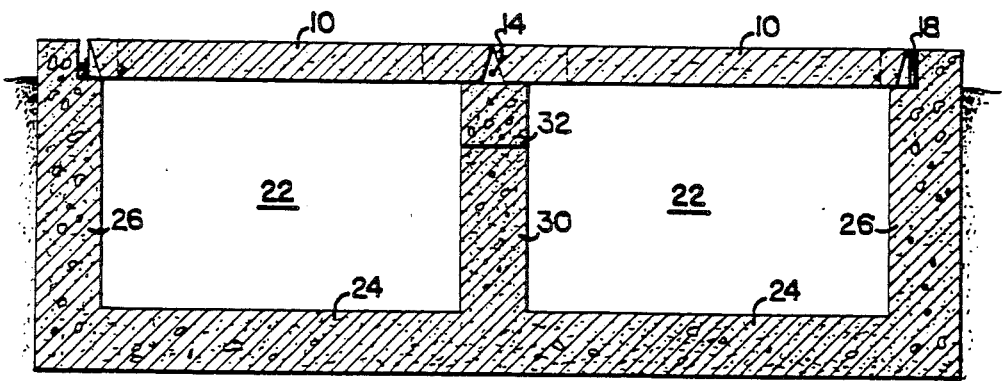
FIG. 5 is a cross-section taken along 5—5 of FIG. 4.

FIG. 4 and 5 shows a pit 22 formed of poured concrete with a floor 24, side walls 26 having ledges 28, and concrete supporting columns 30. Concrete cross-members 32 are supported by columns 30.

Flooring members 10 are supported by cross-members 32 on one end and ledges 28 on the opposite end. Center spacers 12 provide spacing between the flooring members 10 at cross-members 32 and spacers 16 provide spacing between the flooring members 10 at ledges 28. Since center spacers 12 and end spacers 16 have the same cross-section the spacing between flooring members 10 is the same on both ends with the flooring members which align the flooring members parallel to one another with the spacing across the top being uniform.

Figure 6:
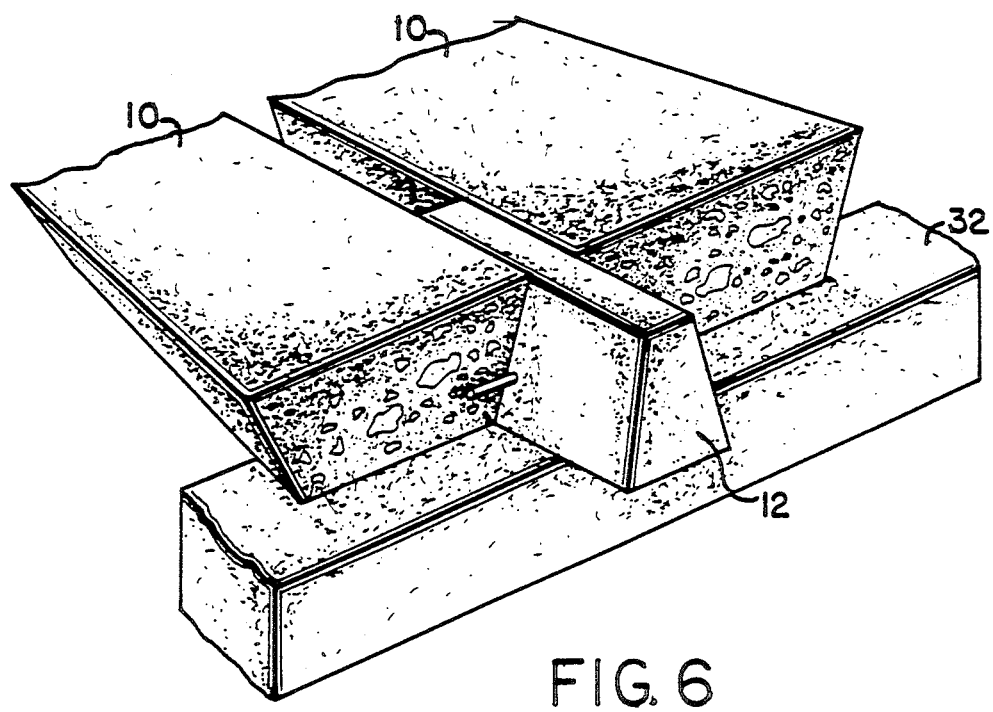
FIG. 6 is an isometric view of ends of supported flooring held spaced apart by a center space.

FIG. 6 is a detail of center spacer 12 showing how rod 12 bears against the ends of flooring members 10 to prevent center spacer 14 from sliding with respect to cross-member 32. Referring again to FIGS. 4 and 5, rod 14 is seen to be between floor members 10 in the space within the tapered ends of the floor members. Center spacer 12 can only move a limited distance until rod 14 will bear against the ends of floor members 10. Since this distance is considerably less than the width of cross-member 32, this insures that center spacer 12 will remain on top of the cross-member and between floor members 10.

Figure 7:
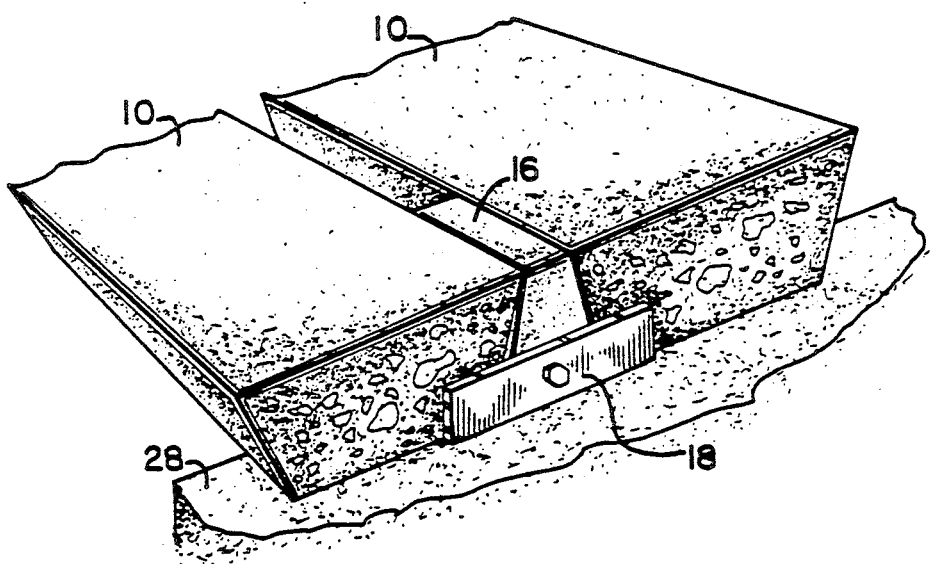
FIG. 7 is an isometric view of ends of supported flooring held spaced apart by an end spacer.

FIG. 7 is a detail showing how bar 18 of end spacer 16 bears against the ends of floor members 10 to prevent end spacer 16 from sliding with respect to ledge 28. Referring again to FIGS. 4 and 5, end spacer 16 can only move a limited distance until bar 18 will bear against the ends of floor members 10. Since this distance is also considerably less than the width of ledge 28, this insures that end spacer 16 will remain on top of the ledge and between floor members 10.

Not that the ends of floor members 10 adjacent to end spacers 16 do not have to be tapered inward to accommodate bar 18. Flooring members 10 are preferably manufactured with a taper on all sides, so there is no requirement to orient the flooring member in any particular way during installation, which saves considerable time. Since end spacer 16 is retained in position over ledge 28 regardless of whether the adjacent short end of flooring member 10 is tapered or not, this provides installation ease with no penalty. If flooring member 10 is used with more than one cross-member 32 then both ends of the flooring member extending between the cross-members would have to be tapered on both short ends to accommodate center spacers 12 on each end. By providing a taper on all sides flooring member 10 can be used in all of these cases. There is an exception when floor members 10 reach from one ledge to another. Since both short ends are adjacent to end spacers, neither short edge of flooring member 10 need be inclined.

This approach to providing a slatted floor for animals over a pit to provide cleaning ease has been reduced to the minimum essential elements. For installation where the flooring members reach from one ledge to another only the flooring members and the end spacers need be used. For installations having a center support then center spacers are used. These spacers are all that is necessary to align the complimentary shaped flooring members and no cement is required for installation. Since no cement is used, this permits readily changing a damaged flooring member, end spacer or center spacer after the initial installation.

Manufacturing the flooring members, center spacer and end spacer from cement provides an inexpensive but weatherproof and corrosion proof material, although other weather and corrosion proof materials could be used. Similarly the use of a fiberglass rod and metal bar also provides the essential properties inexpensively with weather and corrosion resistance, although other materials could be used.

This invention provides simple flooring apparatus which has all of the necessary properties to provide a slatted floor, which can be assembled without mortar, and where all elements are easily replaceable at any time after installation.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. Slatted floor apparatus for animal housing for placement upon horizontal supporting surfaces, the apparatus comprising:

a) a plurality of generally wedge shaped floor members having rectangular shaped opposed essentially parallel upper and bottom surfaces, having inwardly and downwardly inclined opposed sides extending between the upper surface and the bottom surface along the major dimension thereof, and having inwardly and downwardly inclined opposed ends extending between the upper surface and the bottom surface along the minor dimension thereof;

b) a plurality of generally wedge shaped center spacers having rectangular shaped opposed essentially parallel upper and bottom surfaces with a major dimension less than the major dimension of the upper surface of the flooring member, said center spacers having outwardly and downwardly inclined opposed sides extending between the upper surface and the bottom surface along the major dimension thereof, said center spacers having opposed extensions extending outward from each inclined side a predetermined distance, said extensions being generally centered with respect to each respective inclined side, and oriented essentially perpendicular to the major dimension of the upper and bottom surfaces and essentially parallel to said surfaces; said extensions predetermined distance and size being such that with a center spacer and a first pair of floor members supported with their bottom surface planar, with their major dimensions aligned, with one of the inclined ends of the first pair of floor members being contiguous to each other such as to define a generally triangular shaped space within the adjacent inclined ends, with an inclined side of the center spaced contiguous to an inclined side of the floor members and with the major dimension of the center spacers centered with respect to the first pair of floor members, one of said extensions will extend within the triangular shaped spaced defined by the adjacent inclined ends of the first pair of floor members opposite the floor member ends;

c) a plurality of generally wedge shaped end spacers having rectangular shaped opposed essentially parallel upper and bottom surfaces with a major dimension less than the major dimension of the upper surface of the floor members, said end spacers, having outwardly and downwardly inclined opposed sides extending between the upper surface and the bottom surface along the major dimension thereof, and having generally parallel and perpendicular opposed ends extending between the upper surface and the bottom surface along the minor dimension thereof, said end spacers having opposed projections attached to one end which are oriented generally perpendicular to the major dimensions of the upper and bottom surfaces and generally parallel thereto; said projections each extending outward beyond the inclined sides a predetermined distance such that a pair of floor members and an end spacer supported with their bottom surfaces planar, with their major dimensions aligned, with the floor members bracketing, one of said end spacers, with an inclined side of each floor member contiguous with an inclined side of the end spacer, and with the ends of the floor member and the end of the end spacer all being aligned in a direction perpendicular to their major dimensions, then said projections will extend at least partially across the adjacent ends of the floor members.

2. Apparatus as in claim 1 wherein the center spacer extensions comprise the ends of a rod embedded in the floor member.

3. Apparatus as in claim 1 wherein the end spacer projections comprise a metal bar attached to the end of the end spacer.

* * * * *